(12) United States Patent
Nam

(10) Patent No.: US 9,777,519 B1
(45) Date of Patent: Oct. 3, 2017

(54) DOOR CHECKER UNIT FOR VEHICLE

(71) Applicant: Hyundai Motor Company, Seoul (KR)

(72) Inventor: Jinwoo Nam, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/359,985

(22) Filed: Nov. 23, 2016

(30) Foreign Application Priority Data

Sep. 9, 2016 (KR) .................. 10-2016-0116724

(51) Int. Cl.
*E05C 17/20* (2006.01)
*E05C 17/18* (2006.01)
*F16N 11/08* (2006.01)

(52) U.S. Cl.
CPC ............ *E05C 17/203* (2013.01); *E05C 17/18* (2013.01); *F16N 11/08* (2013.01); *F16N 2210/04* (2013.01); *Y10T 16/6295* (2015.01)

(58) Field of Classification Search
CPC ...... E05C 17/203; E05C 17/18; E05C 17/206; F16N 11/08; F16N 2210/04; E05F 5/025; Y10T 16/61; Y10T 16/6295; Y10T 16/537; E05Y 2900/531; E05D 11/02
USPC ....... 16/86 C, 82, 273; 292/262; 296/146.11; 184/37
See application file for complete search history.

(56) References Cited

U.S. PATENT DOCUMENTS

| | | | | |
|---|---|---|---|---|
| 5,474,344 A | * | 12/1995 | Lee ........................ | E05C 17/203 16/86 C |
| 6,446,305 B1 | * | 9/2002 | Kneeland .............. | E05C 17/206 16/49 |
| 7,240,399 B2 | * | 7/2007 | Murayama ............ | E05C 17/203 16/82 |
| 7,469,944 B2 | * | 12/2008 | Kitayama ............. | E05C 17/203 16/86 A |
| 9,003,604 B2 | * | 4/2015 | Matsuki ................. | E05F 5/025 16/86 C |
| 9,447,623 B2 | * | 9/2016 | Murayama ............. | B60J 5/00 |
| 2003/0037411 A1 | * | 2/2003 | Seo ........................ | E05C 17/206 16/86 C |
| 2004/0075285 A1 | | 4/2004 | Murayama et al. | |
| 2010/0154163 A1 | * | 6/2010 | Hoffmann ............. | E05C 17/203 16/85 |

FOREIGN PATENT DOCUMENTS

| | | |
|---|---|---|
| JP | 05-000413 Y2 | 1/1993 |
| KR | 10-2005-0047734 A | 5/2005 |
| KR | 10-0570384 B1 | 4/2006 |
| KR | 10-2011-0089472 A | 8/2011 |
| KR | 10-2014-0139336 A | 12/2014 |
| KR | 10-2015-0018189 A | 2/2015 |

* cited by examiner

Primary Examiner — William Miller
(74) Attorney, Agent, or Firm — Morgan, Lewis & Bockius LLP

(57) ABSTRACT

A door checker apparatus for a vehicle may include a checker arm which has one end portion mounted on a side outer panel through a hinge bracket, the other end portion at which a stopper is disposed, and a groove; and a slide device which is mounted on a door inside panel, and slides along the checker arm.

7 Claims, 4 Drawing Sheets

DOOR CHECKER UNIT FOR VEHICLE

CROSS-REFERENCE TO RELATED APPLICATION

The present application claims priority to and the benefit of Korean Patent Application No. 10-2016-0116724 filed on Sep. 9, 2016, the entire contents of which are incorporated herein by reference.

BACKGROUND OF THE INVENTION

Field of the Invention

The present invention relates to a door checker unit for a vehicle, and more particularly, to a door checker unit for a vehicle which continuously applies grease onto a checker arm so as to prevent abnormal noise occurring when opening a door.

Description of Related Art

In general, as means for opening, closing, and supporting a door for a vehicle, a door hinge and a door checker are installed in the door.

The door hinge is mounted between the door and a vehicle body so that the door is openably and closably mounted on the vehicle body.

The door checker is positioned at a center of the door hinge, and has a function of holding the door so that the door remains opened at a predetermined angle, and a function of stopping the door when the door is fully opened.

Here, one side of the door checker is connected to the vehicle body through a hinge bracket, and a stopper is installed at the other side of the door checker. The door checker includes a checker arm which has a plurality of grooves formed on a surface thereof, and a slide unit which slides on the checker arm and is restricted in respect to an opening degree by the stopper through the grooves.

Grease is applied in the grooves in the door checker when the vehicle is shipped in order to prevent abnormal noise between the slide unit and the checker arm.

However, in the case of the door checker for a vehicle in the related art, the applied grease disappears as usage of the door checker is increased or as time elapses.

Because the door checker in the related art has no separate device for additionally applying grease, there are problems in that if the grease applied onto the checker arm disappears, the door checker is damaged, and for this reason, unpleasant noise or an operational defect occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a door checker unit for a vehicle which prevents abnormal noise between the checker arm and the slider by filling a grease chamber, which is configured between a base plate mounted to a door inside panel and a case, with grease, and continuously applying the grease onto a checker arm.

Various aspects of the present invention are directed to providing a door checker unit for the vehicle, the door checker unit including: a checker arm which may have a first end portion mounted on a side outer panel through a hinge bracket, a second end portion at which a stopper is positioned, and a groove; and a slide unit which is mounted on a door inside panel, and slides along the checker arm, in which the slide unit includes: a base plate which is mounted on the door inside panel, and may have a slide hole formed at a center thereof based on a longitudinal direction; a case which is mounted on the base plate, and may have a through hole which is formed at a position corresponding to the slide hole, first and second space portions which are formed in protruding portions that protrude at upper and lower sides based on the through hole in a direction opposite to a direction toward the hinge bracket, and first and second grease chambers which are formed to be filled with grease by partitioning the first and second space portions by partition walls; first and second sliders which each have therein at least one grease slot, and are provided, together with elastic members, in the first and second space portions so that the first and second sliders slide in a state of being in contact with the groove of the checker arm; and push covers which close open ends of the first and second grease chambers, and push the grease with which the first and second grease chambers are filled.

Fixing portions, which are bent toward the case at a first side and a second side in a width direction to fix the case, may be integrally formed at upper and lower portions of the base plate.

At least one injection hole may be formed in the partition wall to correspond to each of the first and second space portions.

When the door is opened and closed, the slide unit may allow the push covers, which repeatedly contact with the stopper, to push the grease with which the first and second grease chambers are filled so that the grease is supplied to the checker arm and the first and second sliders through the grease slots.

The elastic members may be rubber blocks which are mounted at the first and second space portions, are positioned outside the first and second sliders, and elastically support the first and second sliders to press the first and second sliders against upper and lower portions of the checker arm.

The push cover may be fixed in a state of being partially inserted into an open tip of each of the first and second grease chambers.

The push cover may include an elastic material and have a rounded portion that protrudes toward the stopper.

According to the door checker unit for the vehicle according to the exemplary embodiment of the present invention, the push covers, which cover the grease chambers, push the grease when the door is fully opened, and continuously supply the grease to the checker arm, and as a result, it is possible to prevent the occurrence of abnormal noise and corrosion between the checker arm and the sliders.

In addition, other effects obtained or expected by the exemplary embodiments of the present invention will be directly or implicitly disclosed in the DETAILED DESCRIPTION of the present invention. That is, various effects expected according to the exemplary embodiments of the present invention will be disclosed in the detailed description to be described below.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
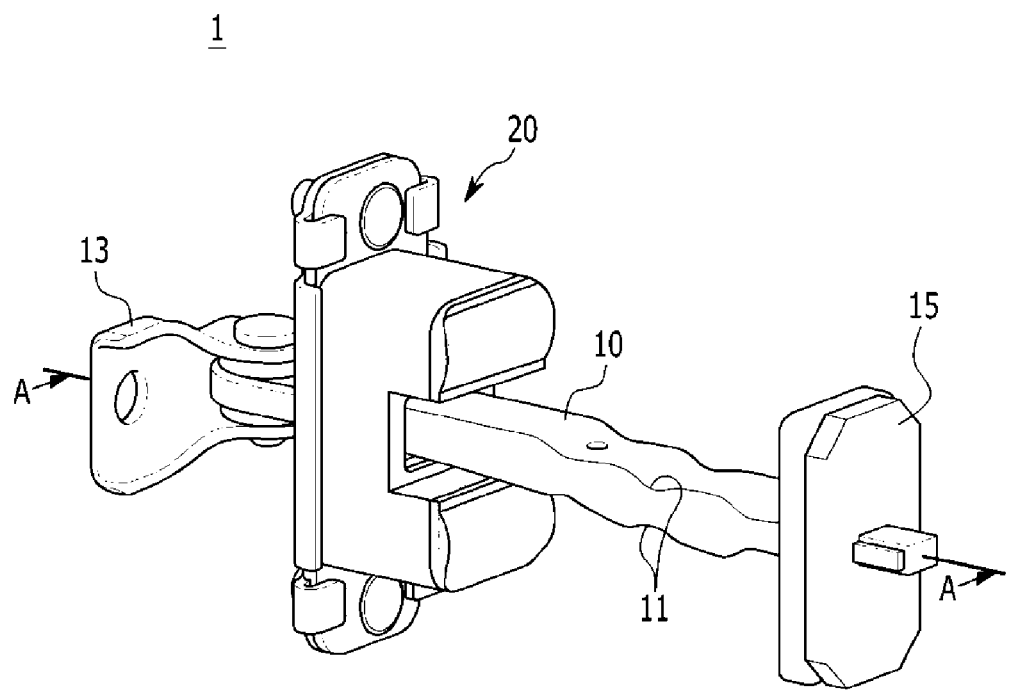
FIG. 1 is a perspective projection view of a door checker unit for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
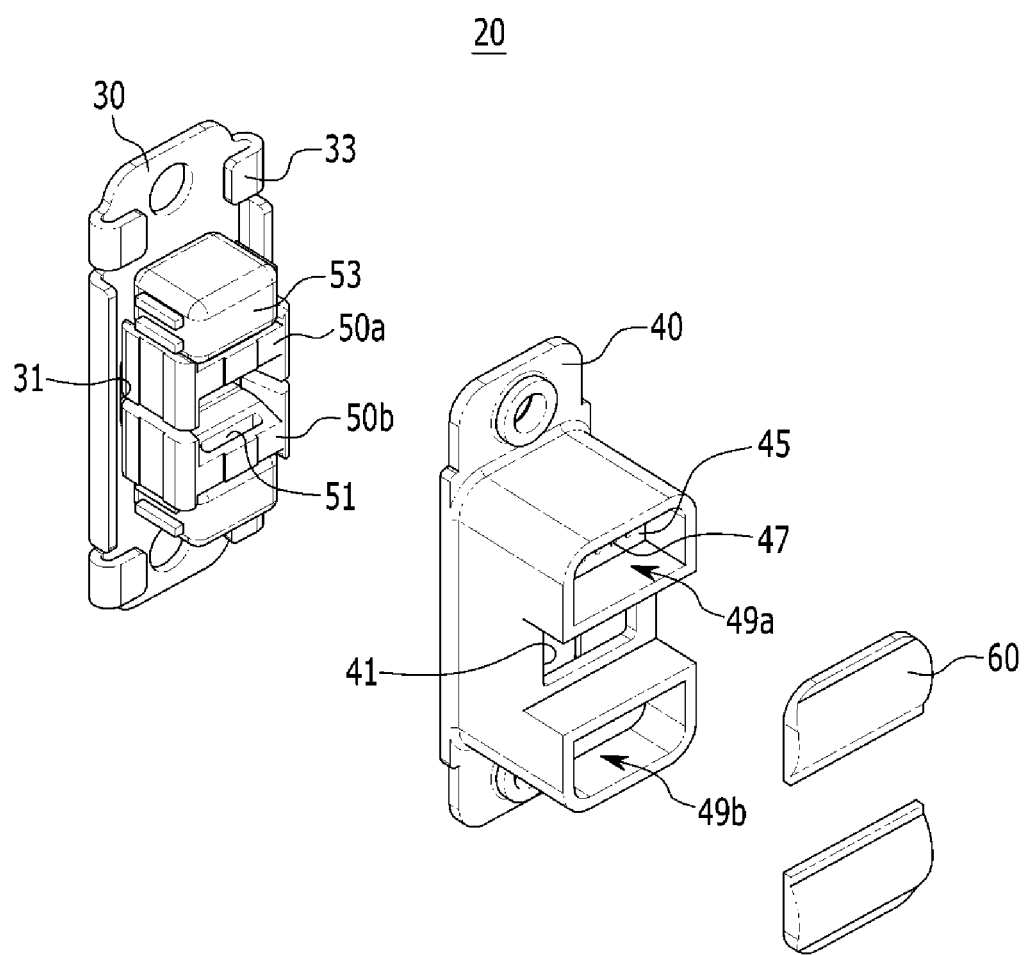
FIG. 2 is an exploded view of the door checker unit for a vehicle according to the exemplary embodiment of the present invention.
Figure 3:
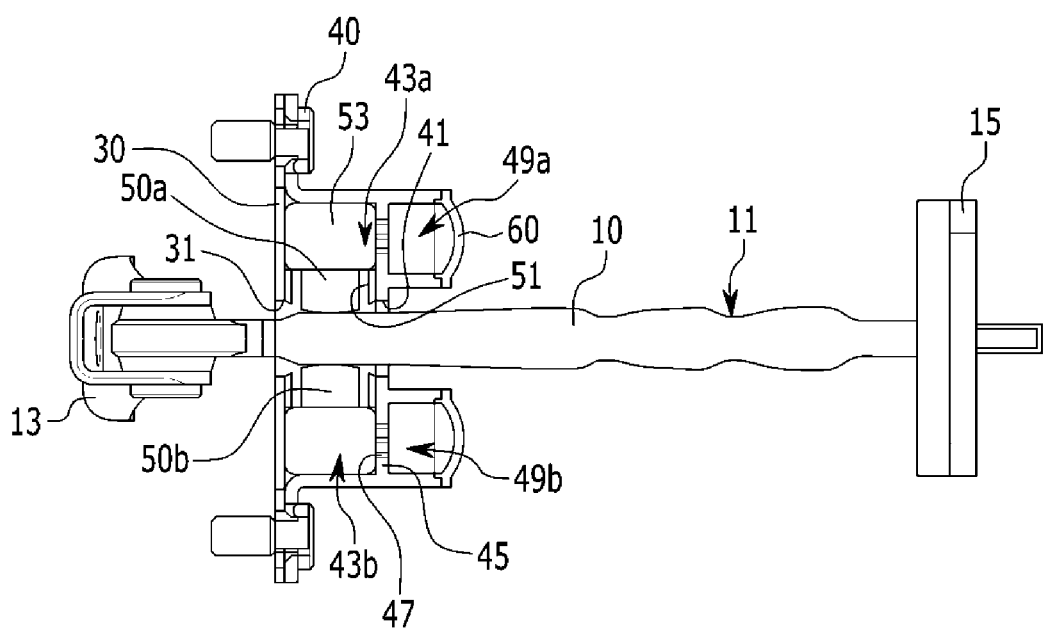
FIG. 3 is a cross-sectional view taken along line A-A of FIG. 1.

FIG. 1 is a perspective projection view of a door checker unit for a vehicle according to an exemplary embodiment of the present invention, FIG. 2 is an exploded view of the door checker unit for a vehicle according to the exemplary embodiment of the present invention, and FIG. 3 is a cross-sectional view taken along line A-A of FIG. 1.

Referring to FIGS. 1 to 3, a door checker unit 1 for a vehicle according to the exemplary embodiment of the present invention connects a door and a vehicle body, such that the door is maintained in an opened state within a preset range.

The door checker unit 1 for a vehicle includes a checker arm 10 and a slide unit 20.

A first end portion of the checker arm 10 is mounted to a side outer panel through a hinge bracket 13, and a stopper 15 is positioned on a second end portion of the checker arm 10.

In addition, at least one groove 11 is formed in upper and lower portions of the checker arm 10.

The grooves 11 may be formed at positions spaced apart from each other at preset intervals in a longitudinal direction of the checker arm 10.

Further, the slide unit 20 is mounted on a door inside panel, and slides along the checker arm 10.

As illustrated in FIGS. 1 to 3, the slide unit 20 includes a base plate 30, a case 40, first and second sliders 50a and 50b, and push covers 60.

First, the base plate 30 is mounted on the door inside panel.

A slide hole 31 is formed at a center of the base plate 30 based on a longitudinal direction so that the base plate 30 is fitted with the checker arm 10.

The case 40 is mounted on the base plate 30.

Here, fixing portions 33, which are bent toward the case 40 at a first side and a second side in a width direction to fix the case 40, are integrally or monolithically formed at upper and lower portions of the base plate 30.

That is, the case 40 is mounted on the base plate 30 by the fixing portions 33.

A through hole 41, which corresponds to the slide hole 31, is formed in the case 40.

First and second space portions 43a and 43b are formed in protruding portions of the case 40 which protrude at upper and lower sides based on the through hole 41 in a direction opposite to a direction toward the hinge bracket 13.

In addition, first and second grease chambers 49a and 49b are formed on the case 40 to be filled with grease by partitioning the first and second space portions 43a and 43b by partition walls 45.

Here, a plurality of injection holes 47 is formed in the partition walls 45 to correspond to the first and second space portions 43a and 43b.

The injection holes 47 may allow grease with which the first and second grease chambers 49a and 49b are filled to flow into the first and second space portions 43a and 43b.

Further, the first and second sliders 50a and 50b are provided, together with elastic members 53, in the first and second space portions 43a and 43b so that the first and second sliders 50a and 50b slide in a state of being in contact with the grooves 11 of the checker arm 10.

That is, when opening the door, the first and second sliders 50a and 50b may slide along the checker arm 10 in a state in which the first and second sliders 50a and 50b are in contact with the groove 11.

The elastic members 53 are mounted at the first and second space portions 43a and 43b. The elastic members 53 are positioned outside the first and second sliders 50a and 50b to press the first and second sliders 50a and 50b against the upper and lower portions of the checker arm 10, respectively.

The elastic members 53, which are configured as described above, may be rubber blocks that elastically support the first and second sliders 50a and 50b.

That is, the elastic members 53 are positioned outside upper and lower portions of the case 40 based on the through hole 41, respectively, and provide elastic force to an upper portion of the first slider 50a and a lower portion of the second slider 50b.

Meanwhile, at least one grease slot 51 is formed inside each of the first and second sliders 50a and 50b.

Two grease slots 51 are formed by vertically penetrating a first side and a second side of each of the first and second sliders 50a and 50b based on a longitudinal direction of the checker arm 10.

The grease slots 51 may allow the grease, which is introduced from the first and second grease chambers 49a and 49b to the first and second space portions 43a and 43b, to be applied onto the checker arm 10.

Meanwhile, in the present exemplary embodiment, an example in which the two grease slots 51 are formed is described, but the present invention is not limited thereto, and the number and the positions of the grease slots 51 may be changed.

Each of the push covers 60 closes one open end of each of the first and second grease chambers 49a and 49b, and pushes the grease with which the first and second grease chambers 49a and 49b are filled.

The push cover 60 may contact with the stopper 15 when the door is fully opened.

That is, when the door is fully opened, the push covers 60 contact with the stopper 15 and allow the grease, with which the first and second grease chambers 49a and 49b are filled, to flow into the first and second space portions 43a and 43b through the injection holes 47.

The push cover 60 is fixed in a state of being partially inserted into an open tip of each of the first and second grease chambers 49a and 49b.

As an example, the push cover 60 may be fixed by being fitted with each of the first and second grease chambers 49a and 49b, or may be fixed by an adhesive.

Here, the push cover 60 may include an elastic material and have a rounded portion that protrudes toward the stopper 15 so that the grease may smoothly flow into the injection hole 47 when the push cover 60 contacts with the stopper 15.

The elastic material may be a plastic material or a rubber material with high elastic force.

Figure 4:
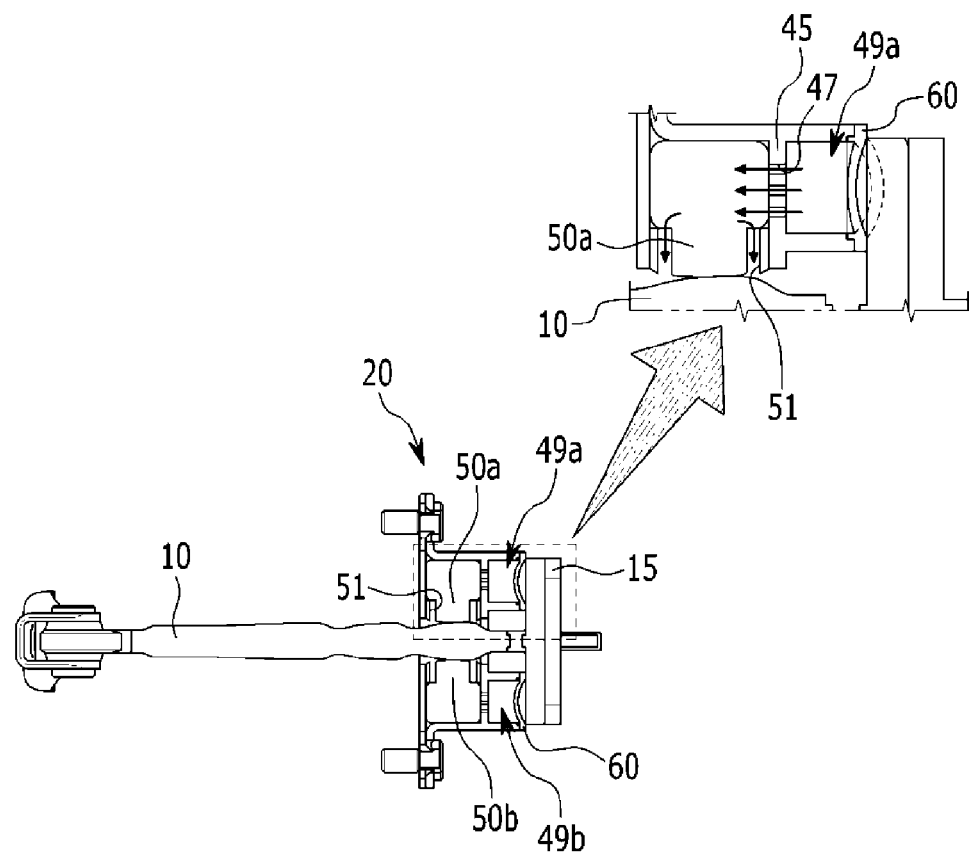
FIG. 4 is a view illustrating an operation of the door checker unit for a vehicle according to the exemplary embodiment of the present invention.

FIG. 4 is a view illustrating an operation of the door checker unit for a vehicle according to the exemplary embodiment of the present invention.

Referring to FIG. 4, in the door checker unit 1 for a vehicle according to the exemplary embodiment of the present invention, the slide units 20 are moved along the checker arm 10 toward the stopper 15 when the door is fully opened.

Therefore, the push covers 60 are pushed by coming into contact with the stopper 15, and provide pressing force to the first and second grease chambers 49a and 49b.

Then, the grease with which the first and second grease chambers 49a and 49b are filled flows into the first and second space portions 43a and 43b through the injection holes 47 formed in the partition walls 45.

Thereafter, the introduced grease is supplied between the checker arm 10 and the first and second sliders 50a and 50b through the grease slots 51 of the first and second sliders 50a and 50b.

That is, when the door is configured to be opened or closed, the slide unit 20 allows the push covers 60, which repeatedly contact with the stopper 15, to push the grease with which the first and second grease chambers 49a and 49b are filled so that the grease is supplied to the checker arm 10 and the first and second sliders 50a and 50b through the grease slots 47.

Accordingly, according to the door checker unit 1 for the vehicle according to the exemplary embodiment of the present invention, the push covers 60, which cover the first and second grease chambers 49a and 49b, push the grease when the door is fully opened, and continuously supply the grease to the checker arm 10, and as a result, it is possible to prevent the occurrence of abnormal noise and corrosion between the checker arm 10 and the first and second sliders 50a and 50b.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door checker apparatus for a vehicle, the door checker apparatus comprising:
    a checker arm which has a first end portion mounted on a side outer panel through a hinge bracket, a second end portion at which a stopper is positioned, and a groove; and
    a slide device which is mounted on a door inside panel, and slides along the checker arm,
    wherein the slide device includes:
    a base plate which is mounted on the door inside panel, and has a slide hole formed at a center of the base plate along a longitudinal direction of the base plate;
    a case which is mounted on the base plate, and has a through hole which is formed at a position corresponding to the slide hole, first and second space portions which are formed in protruding portions that protrude at upper and lower sides of the through hole in a direction opposite to a direction toward the hinge bracket, and first and second grease chambers which are formed to be filled with grease by partitioning the first and second space portions by partition walls;
    first and second sliders which each have therein at least one grease slot, and are provided, together with elastic members, in the first and second space portions so that the first and second sliders slide in a state of being in contact with the groove of the checker arm; and
    push covers which close open ends of the first and second grease chambers, and push the grease with which the first and second grease chambers are filled.

2. The door checker apparatus of claim 1, wherein fixing portions, which are bent toward the case at a first side and a second side in a width direction to fix the case, are integrally formed at upper and lower portions of the base plate.

3. The door checker apparatus of claim 1, wherein at least one injection hole is formed in the partition walls to correspond to each of the first and second space portions.

4. The door checker apparatus of claim 3, wherein
    when the door is configured to be opened or closed, the slide device allows the push covers, which repeatedly contact with the stopper, to push the grease with which the first and second grease chambers are filled so that the grease is supplied to the checker arm and the first and second sliders through the at least one grease slot.

5. The door checker apparatus of claim 1, wherein the elastic members are rubber blocks which are mounted at the first and second space portions, are positioned outside the first and second sliders, and elastically support the first and second sliders to press the first and second sliders against upper and lower portions of the checker arm.

6. The door checker apparatus of claim 1, wherein the push cover is fixed in a state of being partially inserted into an open tip of each of the first and second grease chambers.

7. The door checker apparatus of claim 1, wherein the push cover includes an elastic material and has a rounded portion that protrudes toward the stopper.

\* \* \* \* \*